Jan. 26, 1960  E. GLATZEL  2,922,337
PHOTOGRAPHIC OBJECTIVE
Filed Nov. 6, 1958  2 Sheets-Sheet 1

Jan. 26, 1960     E. GLATZEL     2,922,337
PHOTOGRAPHIC OBJECTIVE

Filed Nov. 6, 1958     2 Sheets-Sheet 2

2,922,337
PHOTOGRAPHIC OBJECTIVE

Erhard Glatzel, Heidenheim (Brenz), Germany, assignor to Carl Zeiss, Heidenheim (Brenz), Wurttemberg, Germany Application November 6, 1958, Serial No. 772,385

Claims priority, application Germany November 12, 1957

7 Claims. (Cl. 88—57)

The invention concerns photographic objectives which consist of 5 members more particularly, in the direction of the light, of a meniscus-shaped dispersive member with its concave curvature turned towards the diaphragm, of a collective member in which the radii of the two external surfaces are numerically longer than $0.50 \times f$, of a biconvex collective member in which the algebraic sum of the individual surface refractive powers $(\Delta n/r)$ lies within the limits of $1.00 \times 1/f$ and $2.00 \times 1/f$, of a biconcave dispersive member, and of an asymmetrical collective member which turns its more deeply curved surface towards the image.

The invention consists of a special modification of the said type of objective which is basically of prior art. It has been found by investigation that a good compromise between the individual aberrations can be attained if the third member is bent in such a way that its external surface turned towards the fourth member receives a radius lying between the limits $-3.00 \times f$ and $-0.05 \times f$.

Favourable possibilities for the correction with respect to oblique bundles of rays are therein obtained by such objectives in which the overall length lies between the limits $1.00 \times f$ and $3.00 \times f$.

For the correction of distortion it is an advantage to make the air space between the fourth and the fifth member smaller than the air space between the third and the fourth member.

The flattening of the field of image is facilitated if the axial thickness of the third member is made greater than $0.10 \times f$ but less than $0.50 \times f$.

In the following tables the design data for six objectives according to the invention are given of which the objectives according to the Tables I, III, V and VI are represented schematically in section in the Figures 1 to 4 of the appended illustrations. Therein there are designated By L the lenses
By r the radii
By d the axial separations
By n the refractive indices
By v the Abbe numbers
By $\Delta n/r$ the refractive powers of the individual lens surfaces.

Figure 1:
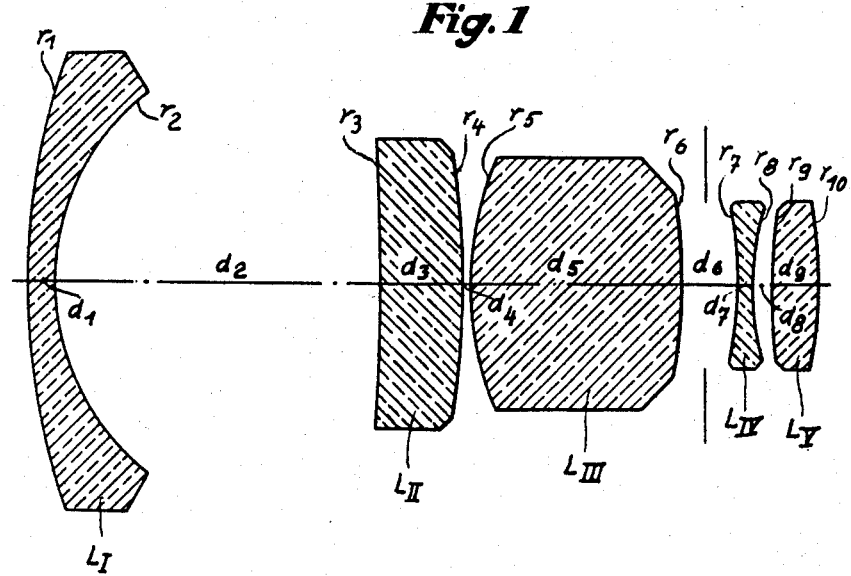
Figure 3:
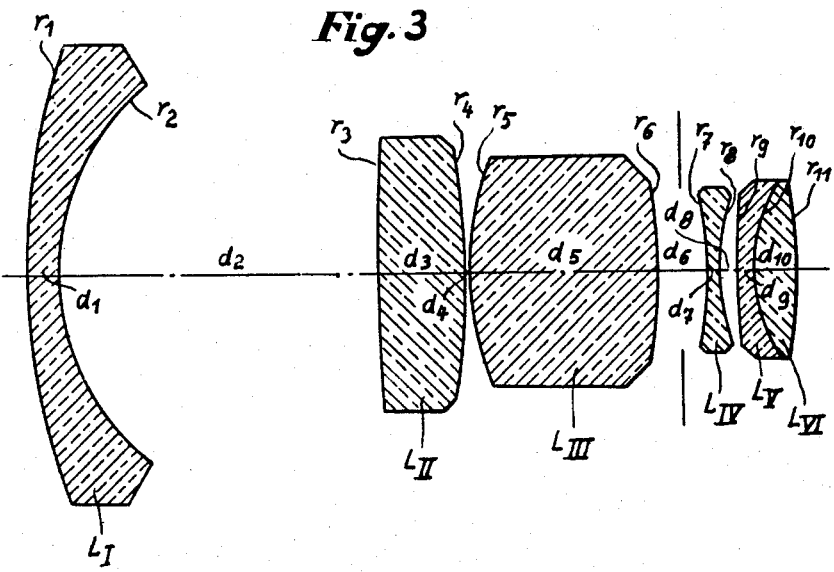

The objectives according to Tables II and IV correspond schematically to the representations in section according to Fig. 1 and Fig. 3 respectively.

Table I (Fig. 1)

[Back focal length $s_0' = 1.0689 \cdot f$. Aperture ratio 1:4.]

| Lenses | Radii | Axial Separations | $n_d$ | $v_d$ | $\Delta n/r$ |
|---|---|---|---|---|---|
| $L_1$ | $r_1 = +1.3434 \cdot f$ | $d_1 = 0.0564 \cdot f$ | 1.61765 | 55.10 | $+0.459766/f$ |
| | $r_2 = +0.4732 \cdot f$ | $d_2 = 0.6503 \cdot f$ | | | $-1.305151/f$ |
| $L_2$ | $r_3 = -6.5892 \cdot f$ | $d_3 = 0.1691 \cdot f$ | 1.48749 | 70.04 | $-0.073983/f$ |
| | $r_4 = -1.3531 \cdot f$ | $d_4 = 0.0028 \cdot f$ | | | $+0.360276/f$ |
| $L_3$ | $r_5 = +0.6221 \cdot f$ | $d_5 = 0.4285 \cdot f$ | 1.62041 | 60.29 | $+0.997364/f$ |
| | $r_6 = -1.0983 \cdot f$ | $d_6 = 0.1128 \cdot f$ | | | $+0.564898/f$ |
| $L_4$ | $r_7 = -0.5915 \cdot f$ | $d_7 = 0.0366 \cdot f$ | 1.69968 | 34.95 | $-1.182911/f$ |
| | $r_8 = +0.5584 \cdot f$ | $d_8 = 0.0378 \cdot f$ | | | $-1.252964/f$ |
| $L_5$ | $r_9 = +1.0904 \cdot f$ | $d_9 = 0.0987 \cdot f$ | 1.62041 | 60.29 | $+0.568985/f$ |
| | $r_{10} = -0.6880 \cdot f$ | | | | $+0.901785/f$ |

Table II (see Fig. 1)

[Back focal length $s_0' = 1.0957 \cdot f$. Aperture ratio 1:4.]

| Lenses | Radii | Axial Separations | $n_d$ | $v_d$ | $\Delta n/r$ |
|---|---|---|---|---|---|
| $L_1$ | $r_1 = +1.3443 \cdot f$ | $d_1 = 0.0564 \cdot f$ | 1.61765 | 55.10 | $+0.459458/f$ |
| | $r_2 = +0.4736 \cdot f$ | $d_2 = 0.6714 \cdot f$ | | | $-1.304270/f$ |
| $L_2$ | $r_3 = -5.7511 \cdot f$ | $d_3 = 0.1692 \cdot f$ | 1.48749 | 70.04 | $-0.084765/f$ |
| | $r_4 = -1.3443 \cdot f$ | $d_4 = 0.0028 \cdot f$ | | | $+0.362632/f$ |
| $L_3$ | $r_5 = +0.6270 \cdot f$ | $d_5 = 0.4090 \cdot f$ | 1.62041 | 60.29 | $+0.989521/f$ |
| | $r_6 = -1.1311 \cdot f$ | $d_6 = 0.1128 \cdot f$ | | | $+0.548511/f$ |
| $L_4$ | $r_7 = -0.6092 \cdot f$ | $d_7 = 0.0367 \cdot f$ | 1.69968 | 34.95 | $-1.148560/f$ |
| | $r_8 = +0.5710 \cdot f$ | $d_8 = 0.0226 \cdot f$ | | | $-1.225380/f$ |
| $L_5$ | $r_9 = +1.0990 \cdot f$ | $d_9 = 0.1128 \cdot f$ | 1.62041 | 60.29 | $+0.564517/f$ |
| | $r_{10} = -0.6984 \cdot f$ | | | | $+0.888292/f$ |

Figure 2:
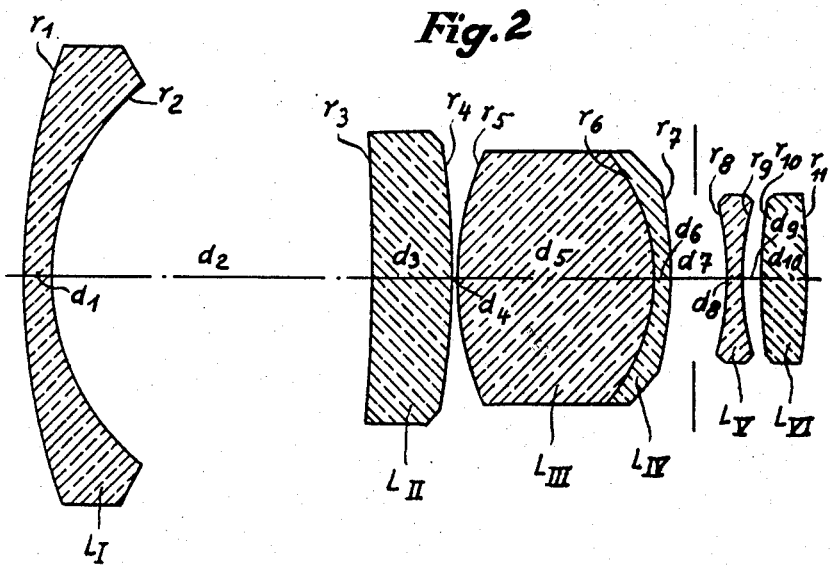

Table III (Fig. 2)

[Back focal length $s_0' = 1.0685 \cdot f$. Aperture ratio 1:4.]

| Lenses | Radii | Axial Separations | $n_d$ | $v_d$ | $\Delta n/r$ |
|---|---|---|---|---|---|
| $L_1$ | $r_1 = +1.3431 \cdot f$ | $d_1 = 0.0564 \cdot f$ | 1.62041 | 60.29 | $+0.461934/f$ |
| | $r_2 = +0.4731 \cdot f$ | $d_2 = 0.6425 \cdot f$ | | | $-1.311316/f$ |
| $L_2$ | $r_3 = -6.5875 \cdot f$ | $d_3 = 0.1691 \cdot f$ | 1.48749 | 70.04 | $-0.074002/f$ |
| | $r_4 = -1.3528 \cdot f$ | $d_4 = 0.0028 \cdot f$ | | | $+0.360367/f$ |
| $L_3$ | $r_5 = +0.6219 \cdot f$ | $d_5 = 0.3945 \cdot f$ | 1.62041 | 60.29 | $+0.997620/f$ |
| $L_4$ | $r_6 = -0.3758 \cdot f$ | $d_6 = 0.0338 \cdot f$ | 1.62012 | 49.81 | $+0.000772/f$ |
| | $r_7 = -1.0980 \cdot f$ | $d_7 = 0.1127 \cdot f$ | | | $+0.564772/f$ |
| $L_5$ | $r_8 = -0.5913 \cdot f$ | $d_8 = 0.0366 \cdot f$ | 1.69761 | 38.65 | $-1.179710/f$ |
| | $r_9 = +0.5583 \cdot f$ | $d_9 = 0.0378 \cdot f$ | | | $-1.249548/f$ |
| $L_6$ | $r_{10} = +1.0901 \cdot f$ | $d_{10} = 0.0986 \cdot f$ | 1.62041 | 60.29 | $+0.569126/f$ |
| | $r_{11} = -0.6878 \cdot f$ | | | | $+0.902008/f$ |

Table IV (see Fig. 3)

[Back focal length $s_0'=1.0720 \cdot f$. Aperture ratio 1:4.]

| Lenses | Radii | Axial Separations | $n_d$ | $\nu_d$ | $\Delta n/r$ |
|---|---|---|---|---|---|
| $L_1$ | $r_1 = +1.3497 \cdot f$ | $d_1 = 0.0562 \cdot f$ | 1.61405 | 55.12 | $+0.454956/f$ |
|  | $r_2 = +0.5073 \cdot f$ | $d_2 = 0.7451 \cdot f$ |  |  | $-1.210475/f$ |
| $L_2$ | $r_3 = \infty$ | $d_3 = 0.1687 \cdot f$ | 1.51680 | 64.20 | $0.000000$ |
|  | $r_4 = -1.5035 \cdot f$ | $d_4 = 0.0028 \cdot f$ |  |  | $+0.343724/f$ |
| $L_3$ | $r_5 = +0.6250 \cdot f$ | $d_5 = 0.4021 \cdot f$ | 1.62041 | 60.29 | $+0.992688/f$ |
|  | $r_6 = -1.3114 \cdot f$ | $d_6 = 0.0984 \cdot f$ |  |  | $+0.473090/f$ |
| $L_4$ | $r_7 = -0.7063 \cdot f$ | $d_7 = 0.0309 \cdot f$ | 1.71020 | 36.50 | $-1.005522/f$ |
|  | $r_8 = +0.4687 \cdot f$ | $d_8 = 0.0337 \cdot f$ |  |  | $-1.515352/f$ |
| $L_5$ | $r_9 = +1.4400 \cdot f$ | $d_9 = 0.0366 \cdot f$ | 1.53358 | 51.60 | $+0.370547/f$ |
| $L_6$ | $r_{10} = +0.3439 \cdot f$ | $d_{10} = 0.0844 \cdot f$ | 1.62041 | 60.29 | $+0.252457/f$ |
|  | $r_{11} = -0.6863 \cdot f$ |  |  |  | $+0.904058/f$ |

Table V (Fig. 3)

[Back focal length $s_0'=1.0700 \cdot f$. Aperture ratio 1:4.]

| Lenses | Radii | Axial Separations | $n_d$ | $\nu_d$ | $\Delta n/r$ |
|---|---|---|---|---|---|
| $L_1$ | $r_1 = +1.3537 \cdot f$ | $d_1 = 0.0564 \cdot f$ | 1.61484 | 51.11 | $+0.454209/f$ |
|  | $r_2 = +0.4804 \cdot f$ | $d_2 = 0.6458 \cdot f$ |  |  | $-1.279983/f$ |
| $L_2$ | $r_3 = +7.5034 \cdot f$ | $d_3 = 0.1692 \cdot f$ | 1.51742 | 52.16 | $+0.068958/f$ |
|  | $r_4 = -1.7042 \cdot f$ | $d_4 = 0.0028 \cdot f$ |  |  | $+0.303613/f$ |
| $L_3$ | $r_5 = +0.6091 \cdot f$ | $d_5 = 0.3765 \cdot f$ | 1.62041 | 60.29 | $+1.018635/f$ |
|  | $r_6 = -1.2687 \cdot f$ | $d_6 = 0.0987 \cdot f$ |  |  | $+0.489001/f$ |
| $L_4$ | $r_7 = -0.7343 \cdot f$ | $d_7 = 0.0282 \cdot f$ | 1.71020 | 36.50 | $-0.967206/f$ |
|  | $r_8 = +0.4501 \cdot f$ | $d_8 = 0.0310 \cdot f$ |  |  | $-1.577801/f$ |
| $L_5$ | $r_9 = +1.3059 \cdot f$ | $d_9 = 0.0367 \cdot f$ | 1.54041 | 50.89 | $+0.413838/f$ |
| $L_6$ | $r_{10} = +0.3256 \cdot f$ | $d_{10} = 0.0804 \cdot f$ | 1.62041 | 60.29 | $+0.245693/f$ |
|  | $r_{11} = -0.6883 \cdot f$ |  |  |  | $+0.901431/f$ |

Figure 4:
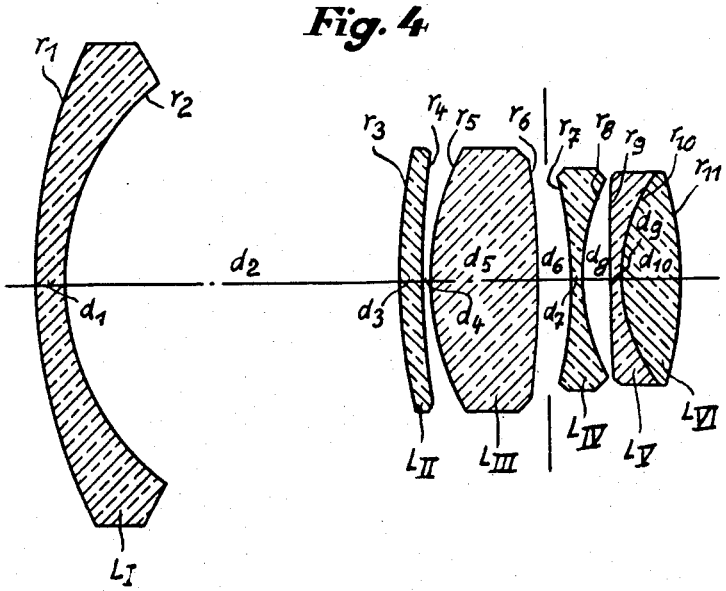

Table VI (Fig. 4)

[Back focal length $s_0'=1.0596 \cdot f$. Aperture ratio 1:2.8.]

| Lenses | Radii | Axial Separations | $n_d$ | $\nu_d$ | $\Delta n/r$ |
|---|---|---|---|---|---|
| $L_1$ | $r_1 = +1.0883 \cdot f$ | $d_1 = 0.0559 \cdot f$ | 1.56883 | 56.04 | $+0.522658/f$ |
|  | $r_2 = +0.5003 \cdot f$ | $d_2 = 0.6634 \cdot f$ |  |  | $-1.136910/f$ |
| $L_2$ | $r_3 = +0.9700 \cdot f$ | $d_3 = 0.0559 \cdot f$ | 1.60140 | 38.28 | $+0.620013/f$ |
|  | $r_4 = +3.0018 \cdot f$ | $d_4 = 0.0028 \cdot f$ |  |  | $-0.200347/f$ |
| $L_3$ | $r_5 = +0.5377 \cdot f$ | $d_5 = 0.2123 \cdot f$ | 1.62041 | 60.29 | $+1.153886/f$ |
|  | $r_6 = -1.8804 \cdot f$ | $d_6 = 0.0670 \cdot f$ |  |  | $+0.329930/f$ |
| $L_4$ | $r_7 = -0.8583 \cdot f$ | $d_7 = 0.0226 \cdot f$ | 1.66998 | 39.20 | $-0.780590/f$ |
|  | $r_8 = +0.4032 \cdot f$ | $d_8 = 0.0559 \cdot f$ |  |  | $-1.661657/f$ |
| $L_5$ | $r_9 = +3.4663 \cdot f$ | $d_9 = 0.0223 \cdot f$ | 1.57501 | 41.31 | $+0.165884/f$ |
| $L_6$ | $r_{10} = +0.3392 \cdot f$ | $d_{10} = 0.1201 \cdot f$ | 1.65830 | 57.49 | $+0.245527/f$ |
|  | $r_{11} = -0.6254 \cdot f$ |  |  |  | $+1.052674/f$ |

I claim:

1. A photographic objective consisting of 5 members more particularly in the sense of the direction of light of a meniscus-shaped dispersive member with its concave curvature turned towards the diaphragm, of a collective member in which the radii of the two external surfaces are numerically longer than $0.50 \times f$., of a biconvex collective member in which the algebraic sum of the individual surface refractive powers $(\Delta n/r)$ lies within the limits of $1.00 \times 1/f$ and $2.00 \times 1/f$, and in which the surface in the third member turned towards the fourth member has a radius within the limits $-3.00 \times f$ and $-0.50 \times f$ wherein $f$ signifies the focal length of the objective, of a biconcave dispersive member, and of an asymmetrical collective member which turns its more deeply curved surface towards the image. in which the overall length of the objective is greater than $1.00 \times f$ but less than $3.00 \times f$, the air space between the fourth and the fifth member is smaller than the air space between the third and the fourth member, and the axial thickness of the third member is greater than $0.10 \times f$ but less than $0.50 \times f$.

2. An objective according to claim 1 with its design data coinciding with the values given in the appended table in so far that each individual surface refractive power $(\Delta n/r)$ lies within a range of $\pm 0.30 \times 1/f$ and each axial separation lies within a range of $\pm 0.50 \times f$ on either side of the value given in the table:

[Back focal length $s_0'=1.0689 \cdot f$. Aperture ratio 1:4.]

| Lenses | Radii | Axial Separations | $n_d$ | $\nu_d$ | $\Delta n/r$ |
|---|---|---|---|---|---|
| $L_1$ | $r_1 = +1.3434 \cdot f$ | $d_1 = 0.0564 \cdot f$ | 1.61765 | 55.10 | $+0.459766/f$ |
|  | $r_2 = +0.4732 \cdot f$ | $d_2 = 0.6503 \cdot f$ |  |  | $-1.305151/f$ |
| $L_2$ | $r_3 = -6.5392 \cdot f$ | $d_3 = 0.1691 \cdot f$ | 1.48749 | 70.04 | $-0.073983/f$ |
|  | $r_4 = -1.3531 \cdot f$ | $d_4 = 0.0028 \cdot f$ |  |  | $+0.360276/f$ |
| $L_3$ | $r_5 = +0.6221 \cdot f$ | $d_5 = 0.4285 \cdot f$ | 1.62041 | 60.29 | $+0.997364/f$ |
|  | $r_6 = -1.0983 \cdot f$ | $d_6 = 0.1128 \cdot f$ |  |  | $+0.564898/f$ |
| $L_4$ | $r_7 = -0.5915 \cdot f$ | $d_7 = 0.0366 \cdot f$ | 1.69968 | 34.95 | $-1.182911/f$ |
|  | $r_8 = +0.5584 \cdot f$ | $d_8 = 0.0378 \cdot f$ |  |  | $-1.252964/f$ |
| $L_5$ | $r_9 = +1.0904 \cdot f$ | $d_9 = 0.0987 \cdot f$ | 1.62041 | 60.29 | $+0.568985/f$ |
|  | $r_{10} = -0.6880 \cdot f$ |  |  |  | $+0.901785/f$ | wherein $r_1$ to $r_{10}$ are the respective radii of the refracting surfaces of the lenses $L_1$ to $L_5$, $d_1$ to $d_9$ are the axial separations and thicknesses between the refractive surfaces of the lenses, $n_d$ is the refractive index of the several lens materials, and $\nu_d$ is the corresponding dispersion ratio or Abbe number of the corresponding lens materials.

3. An objective according to claim 1 with its design data coinciding with the values given in the appended table in so far that each individual surface refractive power $(\Delta n/r)$ lies within a range of $\pm 0.30 \times 1/f$ and each axial separation lies within a range of $\pm 0.50 \times f$ on either side of the value given in the table:

[Back focal length $s_0'=1.0957 \cdot f$. Aperture ratio 1:4.]

| Lenses | Radii | Axial Separations | $n_d$ | $\nu_d$ | $\Delta n/r$ |
|---|---|---|---|---|---|
| $L_1$ | $r_1 = +1.3443 \cdot f$ | $d_1 = 0.0564 \cdot f$ | 1.61765 | 55.10 | $+0.459458/f$ |
|  | $r_2 = +0.4736 \cdot f$ | $d_2 = 0.6714 \cdot f$ |  |  | $-1.304270/f$ |
| $L_2$ | $r_3 = -5.7511 \cdot f$ | $d_3 = 0.1692 \cdot f$ | 1.48749 | 70.04 | $-0.084765/f$ |
|  | $r_4 = -1.3443 \cdot f$ | $d_4 = 0.0028 \cdot f$ |  |  | $+0.362632/f$ |
| $L_3$ | $r_5 = +0.6270 \cdot f$ | $d_5 = 0.4090 \cdot f$ | 1.62041 | 60.29 | $+0.989521/f$ |
|  | $r_6 = -1.1311 \cdot f$ | $d_6 = 0.1128 \cdot f$ |  |  | $+0.548511/f$ |
| $L_4$ | $r_7 = -0.6092 \cdot f$ | $d_7 = 0.0367 \cdot f$ | 1.69968 | 34.95 | $-1.148560/f$ |
|  | $r_8 = +0.5710 \cdot f$ | $d_8 = 0.0226 \cdot f$ |  |  | $-1.225380/f$ |
| $L_5$ | $r_9 = +1.0990 \cdot f$ | $d_9 = 0.1128 \cdot f$ | 1.62041 | 60.29 | $+0.564517/f$ |
|  | $r_{10} = -0.6984 \cdot f$ |  |  |  | $+0.888292/f$ | wherein $r_1$ to $r_{10}$ are the respective radii of the refracting surfaces of the lenses $L_1$ to $L_5$, $d_1$ to $d_9$ are the axial separations and thicknesses between the refractive surfaces of the lenses, $n_d$ is the refractive index of the several lens materials, and $\nu_d$ is the corresponding dispersion ratio or Abbe number of the corresponding lens materials.

4. An objective according to claim 1 with its design data coinciding with the values given in the appended table in so far that each individual surface refractive power $(\Delta n/r)$ lies within a range of $\pm 0.30 \times 1/f$ and each axial separation lies within a range of $\pm 0.50 \times f$ on either side of the value given in the table:

[Back focal length $s_0' = 1.0685 \cdot f$. Aperture ratio 1:4.]

| Lenses | Radii | Axial Separations | $n_d$ | $\nu_d$ | $\Delta n/r$ |
|---|---|---|---|---|---|
| $L_1$ | $r_1 = +1.3431 \cdot f$ | | 1.62041 | 60.29 | $+0.461934/f$ |
| | $r_2 = +0.4731 \cdot f$ | $d_1 = 0.0564 \cdot f$ | | | $-1.311316/f$ |
| $L_2$ | $r_3 = -6.5875 \cdot f$ | $d_2 = 0.6425 \cdot f$ | 1.48749 | 70.04 | $-0.074002/f$ |
| | $r_4 = -1.3528 \cdot f$ | $d_3 = 0.1691 \cdot f$ | | | $+0.360367/f$ |
| $L_3$ | $r_5 = +0.6219 \cdot f$ | $d_4 = 0.0028 \cdot f$ | 1.62041 | 60.29 | $+0.997620/f$ |
| | $r_6 = -0.3758 \cdot f$ | $d_5 = 0.3945 \cdot f$ | | | $+0.000772/f$ |
| $L_4$ | $r_7 = -1.0980 \cdot f$ | $d_6 = 0.0338 \cdot f$ | 1.62012 | 49.81 | $+0.564772/f$ |
| | $r_8 = -0.5913 \cdot f$ | $d_7 = 0.1127 \cdot f$ | | | $-1.179710/f$ |
| $L_5$ | $r_9 = +0.5583 \cdot f$ | $d_8 = 0.0366 \cdot f$ | 1.69761 | 38.65 | $-1.249548/f$ |
| | $r_{10} = +1.0901 \cdot f$ | $d_9 = 0.0378 \cdot f$ | | | $+0.569126/f$ |
| $L_6$ | $r_{11} = -0.6878 \cdot f$ | $d_{10} = 0.0986 \cdot f$ | 1.62041 | 60.29 | $+0.902008/f$ | wherein $r_1$ to $r_{11}$ are the respective radii of the refracting surfaces of the lenses $L_1$ to $L_6$, $d_1$ to $d_{10}$ are the axial separations and thicknesses between the refractive surfaces of the lenses, $n_d$ is the refractive index of the several lens materials, and $\nu_d$ is the corresponding dispersion ratio or Abbe number of the corresponding lens materials.

5. An objective according to claim 1 with its design data coinciding with the values given in the appended table in so far that each individual surface refractive power $(\Delta n/r)$ lies within a range of $\pm 0.30 \times 1/f$ and each axial separation lies within a range of $\pm 0.50 \times f$ on either side of the value given in the table:

[Back focal length $s_0' = 1.0720 \cdot f$. Aperture ratio 1:4.]

| Lenses | Radii | Axial Separations | $n_d$ | $\nu_d$ | $\Delta n/r$ |
|---|---|---|---|---|---|
| $L_1$ | $r_1 = +1.3497 \cdot f$ | | 1.61405 | 55.12 | $+0.454956/f$ |
| | $r_2 = +0.5073 \cdot f$ | $d_1 = 0.0562 \cdot f$ | | | $-1.210475/f$ |
| $L_2$ | $r_3 = \infty$ | $d_2 = 0.7451 \cdot f$ | 1.51680 | 64.20 | $0.000000$ |
| | $r_4 = -1.5035 \cdot f$ | $d_3 = 0.1687 \cdot f$ | | | $+0.343724/f$ |
| $L_3$ | $r_5 = +0.6250 \cdot f$ | $d_4 = 0.0028 \cdot f$ | 1.62041 | 60.29 | $+0.992688/f$ |
| | $r_6 = -1.3114 \cdot f$ | $d_5 = 0.4021 \cdot f$ | | | $+0.473090/f$ |
| $L_4$ | $r_7 = -0.7063 \cdot f$ | $d_6 = 0.0984 \cdot f$ | 1.71020 | 36.50 | $-1.005522/f$ |
| | $r_8 = +0.4687 \cdot f$ | $d_7 = 0.0309 \cdot f$ | | | $-1.515352/f$ |
| $L_5$ | $r_9 = +1.4400 \cdot f$ | $d_8 = 0.0337 \cdot f$ | 1.53358 | 51.60 | $+0.370547/f$ |
| | $r_{10} = +0.3439 \cdot f$ | $d_9 = 0.0366 \cdot f$ | | | $+0.252457/f$ |
| $L_6$ | $r_{11} = -0.6863 \cdot f$ | $d_{10} = 0.0844 \cdot f$ | 1.62041 | 60.29 | $+0.904058/f$ | wherein $r_1$ to $r_{11}$ are the respective radii of the refracting surfaces of the lenses $L_1$ to $L_6$, $d_1$ to $d_{10}$ are the axial separations and thicknesses between the refractive surfaces of the lenses, $n_d$ is the refractive index of the several lens materials, and $\nu_d$ is the corresponding dispersion ratio or Abbe number of the corresponding lens materials.

6. An objective according to claim 1 with its design data coinciding with the values given in the appended table in so far that each individual surface refractive power $(\Delta n/r)$ lies within a range of $\pm 0.30 \times 1/f$ and each axial separation lies within a range of $\pm 0.50 \times f$ on either side of the value given in the table:

[Back focal length $s_0' = 1.0700 \cdot f$. Aperture ratio 1:4.]

| Lenses | Radii | Axial Separations | $n_d$ | $\nu_d$ | $\Delta n/r$ |
|---|---|---|---|---|---|
| $L_1$ | $r_1 = +1.3537 \cdot f$ | | 1.61484 | 51.11 | $+0.454209/f$ |
| | $r_2 = +0.4804 \cdot f$ | $d_1 = 0.0564 \cdot f$ | | | $-1.279983/f$ |
| $L_2$ | $r_3 = +7.5034 \cdot f$ | $d_2 = 0.6458 \cdot f$ | 1.51742 | 52.16 | $+0.068958/f$ |
| | $r_4 = -1.7042 \cdot f$ | $d_3 = 0.1692 \cdot f$ | | | $+0.303613/f$ |
| $L_3$ | $r_5 = +0.6091 \cdot f$ | $d_4 = 0.0028 \cdot f$ | 1.62041 | 60.29 | $+1.018635/f$ |
| | $r_6 = -1.2687 \cdot f$ | $d_5 = 0.3765 \cdot f$ | | | $+0.489001/f$ |
| $L_4$ | $r_7 = -0.7343 \cdot f$ | $d_6 = 0.0987 \cdot f$ | 1.71020 | 36.50 | $-0.967206/f$ |
| | $r_8 = +0.4501 \cdot f$ | $d_7 = 0.0282 \cdot f$ | | | $-1.577801/f$ |
| $L_5$ | $r_9 = +1.3059 \cdot f$ | $d_8 = 0.0310 \cdot f$ | 1.54041 | 50.89 | $+0.413838/f$ |
| | $r_{10} = +0.3256 \cdot f$ | $d_9 = 0.0367 \cdot f$ | | | $+0.245693/f$ |
| $L_6$ | $r_{11} = -0.6883 \cdot f$ | $d_{10} = 0.0804 \cdot f$ | 1.62041 | 60.29 | $+0.901431/f$ | wherein $r_1$ to $r_{11}$ are the respective radii of the refracting surfaces of the lenses $L_1$ to $L_6$, $d_1$ to $d_{10}$ are the axial separations and thicknesses between the refractive surfaces of the lenses, $n_d$ is the refractive index of the several lens materials, and $\nu_d$ is the corresponding dispersion ratio or Abbe number of the corresponding lens materials.

7. An objective according to claim 1 with its design data coinciding with the values given in the appended table in so far that each individual surface refractive power $(\Delta n/r)$ lies within a range of $\pm 0.30 \times 1/f$ and each axial separation lies within a range of $\pm 0.50 \times f$ on either side of the value given in the table:

[Back focal length $s_0' = 1.0596 \cdot f$. Aperture ratio 1:2.8.]

| Lenses | Radii | Axial Separations | $n_d$ | $\nu_d$ | $\Delta n/r$ |
|---|---|---|---|---|---|
| $L_1$ | $r_1 = +1.0883 \cdot f$ | | 1.56883 | 56.04 | $+0.522658/f$ |
| | $r_2 = +0.5003 \cdot f$ | $d_1 = 0.0559 \cdot f$ | | | $-1.136910/f$ |
| $L_2$ | $r_3 = +0.9700 \cdot f$ | $d_2 = 0.6634 \cdot f$ | 1.60140 | 38.28 | $+0.620013/f$ |
| | $r_4 = +3.0018 \cdot f$ | $d_3 = 0.0559 \cdot f$ | | | $-0.200347/f$ |
| $L_3$ | $r_5 = +0.5377 \cdot f$ | $d_4 = 0.0028 \cdot f$ | 1.62041 | 60.29 | $+1.153886/f$ |
| | $r_6 = -1.8804 \cdot f$ | $d_5 = 0.2123 \cdot f$ | | | $+0.329930/f$ |
| $L_4$ | $r_7 = -0.8583 \cdot f$ | $d_6 = 0.0670 \cdot f$ | 1.66998 | 39.20 | $-0.780590/f$ |
| | $r_8 = +0.4032 \cdot f$ | $d_7 = 0.0226 \cdot f$ | | | $-1.661657/f$ |
| $L_5$ | $r_9 = +3.4663 \cdot f$ | $d_8 = 0.0559 \cdot f$ | 1.57501 | 41.31 | $+0.165884/f$ |
| | $r_{10} = +0.3392 \cdot f$ | $d_9 = 0.0223 \cdot f$ | | | $+0.245527/f$ |
| $L_6$ | $r_{11} = -0.6254 \cdot f$ | $d_{10} = 0.1201 \cdot f$ | 1.65830 | 57.49 | $+1.052674/f$ | wherein $r_1$ to $r_{11}$ are the respective radii of the refracting surfaces of the lenses $L_1$ to $L_6$, $d_1$ to $d_{10}$ are the axial separations and thicknesses between the refractive surfaces of the lenses, $n_d$ is the refractive index of the several lens materials, and $\nu_d$ is the corresponding dispersion ratio or Abbe number of the corresponding lens materials.

References Cited in the file of this patent

UNITED STATES PATENTS

| 1,934,561 | Rayton | Nov. 7, 1933 |
| 2,317,790 | Mellor | Apr. 27, 1943 |
| 2,649,022 | Angenieux | Aug. 18, 1953 |
| 2,826,115 | Lange | Mar. 11, 1958 |
| 2,844,997 | Lange | July 29, 1958 |

FOREIGN PATENTS

| 605,884 | France | Feb. 26, 1926 |
| 1,017,382 | Germany | Oct. 10, 1957 |